(12) United States Patent
Neumann et al.

(10) Patent No.: US 7,825,206 B2
(45) Date of Patent: *Nov. 2, 2010

(54) PROCESS FOR REACTING POLYORGANOSILOXANES AND THEIR USE

(75) Inventors: Thomas Neumann, Bochum (DE); Wilfried Knott, Essen (DE)

(73) Assignee: Evonik Goldschmidt GmbH (DE)

( * ) Notice: Subject to any disclaimer, the term of this patent is extended or adjusted under 35 U.S.C. 154(b) by 282 days.

This patent is subject to a terminal disclaimer.

(21) Appl. No.: 11/956,525

(22) Filed: Dec. 14, 2007

(65) Prior Publication Data

US 2008/0153934 A1 Jun. 26, 2008

(30) Foreign Application Priority Data

Dec. 22, 2006 (DE) .................. 10 2006 061 353

(51) Int. Cl.
*C08G 77/18* (2006.01)
(52) U.S. Cl. .................. 528/13; 528/16; 528/19; 528/29; 524/268
(58) Field of Classification Search .................. None
See application file for complete search history.

(56) References Cited

U.S. PATENT DOCUMENTS

| | | | | |
|---|---|---|---|---|
| 3,417,120 A | * | 12/1968 | Boissieras et al. | 556/422 |
| 3,555,063 A | * | 1/1971 | Nakajima et al. | 556/446 |
| 4,269,992 A | * | 5/1981 | Litteral et al. | 556/446 |
| 7,105,233 B2 | * | 9/2006 | Bechthold et al. | 428/447 |
| 7,442,666 B2 | * | 10/2008 | Herrwerth et al. | 502/100 |
| 2004/0186260 A1 | * | 9/2004 | Hohenberg et al. | 528/25 |
| 2005/0136269 A1 | * | 6/2005 | Doehler et al. | 428/447 |
| 2006/0155090 A1 | * | 7/2006 | Ferenz | 528/31 |
| 2009/0093598 A1 | * | 4/2009 | Venzmer et al. | 525/479 |

FOREIGN PATENT DOCUMENTS

DE 103 12 636 9/2004
WO WO 01/74938 A1 * 10/2001

OTHER PUBLICATIONS

B(C6F5)3-Catalyzed Silation of alcohols: a Mild General Method for Synthesis of Silyl Ethers authored by Blackwell et al. and published in J. Org. Chem. (1999), 64, 4887-4892.*

* cited by examiner

*Primary Examiner*—Marc S Zimmer
(74) *Attorney, Agent, or Firm*—Frommer Lawrence & Haug LLP

(57) ABSTRACT

The invention provides a process for preparing SiOC-bonded polyorganosiloxanes by reacting, by processes known per se, hydroxyl-containing compounds with a stoichiometric excess of polyorganosiloxanes which contain —Si(H) units and are of the general formula (I) in the presence of one or more element compounds of main group III and/or of transition group 3 as a catalyst, wherein the reaction, on completion of conversion of the compounds containing hydroxyl groups, is continued until no further ≡Si—H groups are detectable by gas volumetric means, and also the compounds prepared in this way and their use.

13 Claims, No Drawings

PROCESS FOR REACTING POLYORGANOSILOXANES AND THEIR USE

This application claims benefit under 35 U.S.C. 119(a) of German patent application DE 10 2006 061 353.8, filed on 22 Dec. 2006.

Any foregoing applications, including German patent application DE 10 2006 061 353.8, and all documents cited therein or during their prosecution ("application cited documents"), and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Citation or identification of any document in this application is not an admission that such document is available as prior art to the present invention.

The invention relates to a process for reacting polyorganosiloxanes, in which a hydrogen atom bonded to the silicon is replaced by an alkoxide radical, and to substituted polyorganosiloxanes prepared by this process and to their use.

According to the prior art, polyorganosiloxanes are prepared industrially via the so-called chlorosiloxane route. In the chlorosiloxane route, polyorganosiloxanes substituted by chlorine on the silicon are reacted with alcohols to form alkoxy-substituted polyorganosiloxanes. This process leads inevitably to considerable amounts of hydrochloric acid wastes, which cause ecological problems and considerable costs in their removal.

Compounds in which polyorganosiloxanes are reacted with alcohols to form alkoxy-substituted polyorganosiloxanes, their use and a process for their preparation are referred to in DE 103 12 636 (US Patent Application Publication 2004-186260), DE 10 2004 039 911 (US Patent Application Publication 2006-041097), DE 103 59 764 (US Patent Application Publication 2005-136269), DE 10 2004 024 009 (US Patent Application Publication 2005-287300), DE 10 2004 034 740, DE 10 2005 002 716, DE 10 2006 008 387 (US Patent Application Publication 2007-197678), DE 10 2005 001 039 (US Patent Application Publication 2006-155089), DE 103 12 634, DE 10 2005 051 939 (US Patent Application Publication 2007-100153). The content of these references is hereby incorporated by reference and is considered to form part of the disclosure content of the present application.

DE 103 12 636 (US Patent Application Publication 2004-186260) refers to a process for reacting polyorganosiloxanes containing ≡Si(H) units with at least one alcohol, wherein, in a process step using one or more element compounds of main group III and/or of transition group 3 as a catalyst, hydrogen atoms present in the (H)Si≡ units of the polyorganosiloxane are replaced partly or fully by alkoxide radicals of the alcohols used.

Following the teaching of this reference, it is also possible to provide partly substituted polyorganosiloxanes which, as well as the substituted Si—O—C units, still have unconverted ≡Si(H) units. To this end, the quantitative ratio of ≡Si(H) groups to alcohol groups is preferably established within the range from about 1:0.1 to about 1:0.99 molar equivalents.

As a result of such a reaction in a substoichiometric ratio, a residue of unconverted ≡Si(H) function should be preserved, which can be converted in a subsequent step, for example in a hydrosilylation reaction in which a silicon-carbon bond is formed, in order to prepare mixed products.

It has now been found that, surprisingly, deviating from the prior art disclosed, a route to high molecular weight SiOC-bonded organyloxy-substituted (alkoxy-substituted) polyorganosiloxanes is developed when organylhydroxy compounds are reacted with a stoichiometric excess of terminal and/or lateral hydrogen-polysiloxanes and/or -oligosiloxanes in the presence of one or more element compounds of main group III and/or of transition group 3 as a catalyst, and then the reaction, on completion of conversion of the organylhydroxy compound (alcohol component), is continued until no further ≡Si—H groups are detectable by gas volumetric means. The gas volumetric ≡Si(H) value is determined by the alkoxide-induced decomposition of a sample according to established processes (visual control).

In a manner unforeseeable to those skilled in the art, structures which have markedly better properties as stabilizers in the preparation of polyurethane foams (PU foams), especially rigid PU foams, are obtained in this way. Moreover, structures which find use as defoamers in the paints and coating sectors are obtained in this way.

The invention therefore provides a process for preparing SiOC-bonded, alkoxy-substituted polyorganosiloxanes by reacting organylhydroxy compounds with a stoichiometric excess of terminal and/or lateral hydrogen-polysiloxanes and/or -oligosiloxanes in the presence of one or more element compounds of main group III and/or transition group 3 as a catalyst, wherein, on completion of conversion of the organylhydroxy component (alcohol component), the reaction is continued until no further ≡Si—H groups are detectable by gas volumetric means.

The invention further provides SiOC-bonded alkoxy-substituted polyorganosiloxanes prepared by the above process.

The invention further provides for the use of the compounds prepared by the above process as interface-active additives for preparing polyurethane foams, for example polyurethane ether foams.

The invention further provides for the use of the compounds prepared by the process according to the invention as interface-active additives for preparing defoamers in the paints and coatings sector, for finishing textiles, as additives for plastics or in the masonry paint sector, as additives in radiation-curing coatings, especially printing inks.

A further subject matter of the invention is characterized by the claims.

It was therefore an object of the present invention primarily to provide a process for preparing substituted polyorganosiloxanes with which, avoiding the disadvantages of the prior art, organyloxy groups can be formed without chlorine and with and without solvent and using a stoichiometric excess of terminal and/or lateral hydrogen-polysiloxanes and/or -oligosiloxanes in the reaction with organylhydroxy components, no further ≡Si—H groups being detectable by gas volumetric means in the product formed.

This object is achieved in accordance with the invention by a process for reacting polyorganosiloxanes which contain ≡Si(H) units and are of the general formula (I)

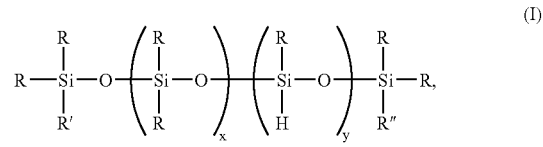

in which
at least one hydrogen atom is bonded to a silicon atom,
R represents one or more identical or different radicals selected from linear or branched, saturated, monounsaturated or polyunsaturated alkyl, aryl, alkaryl or aralkyl radicals having from 1 to 20 carbon atoms, haloalkyl groups having from 1 to 20 carbon atoms, siloxy groups and triorganosiloxy groups,
R' and R" are each independently H or R,
x is an integer from 0 to 300, preferably 8 to 150,
y is an integer from 0 to 100, preferably 1 to 50, with at least one alcohol which is selected from the group of the linear or branched, saturated, monounsaturated or polyunsaturated, aromatic, aliphatic-aromatic mono- or polyalcohols, polyether monoalcohols or polyether polyalcohols, aminoalcohols, especially N-alkyl-, arylamino-EO- and -PO-alcohols, N-alkyl- or arylaminoalcohols, mono- or poly(meth)acrylated monoalkoxylates or polyalkoxylates, hydroxyalkyl methacrylates, hydroxyalkyl acrylates, halogenated mono- or polyalcohols, polyester monoalcohols, polyester polyalcohols, fluorinated or perfluorinated monoalkoxylates or polyalkoxylates and mixtures thereof, with a stoichiometric excess of polyorganosiloxanes which contain ≡Si(H) units and are of the general formula (I) in the presence of one or more element compounds of main group III and/or transition group 3 as a catalyst, characterized in that the reaction, on completion of conversion of the alcohol component, is continued until no further ≡Si—H groups can be detected by gas volumetric means.

In one embodiment of R, the alkyl, aryl, alkaryl or aralkyl radicals have from 1 to 10 carbon atoms and the haloalkyl groups have from 1 to 10 carbon atoms. In another embodiment of R, the alkyl, aryl, alkaryl or aralkyl radicals have from 1 to 4 carbon atoms and the haloalkyl groups have from 1 to 4 carbon atoms.

It should be emphasized that, in the case of use of unsaturated alcohols, no reaction of the ≡Si(H) function on the double bond takes place. In this way, unsaturated SiOC-bonded reaction products can be prepared.

Effective catalysts in the context of the present invention among the Lewis-acidic element compounds of main group 13 include boron-containing and/or aluminum-containing element compounds. The Lewis-acidic element compounds of transition group 3 (new IUPAC convention), include scandium-containing, yttrium-containing, lanthanum-containing and/or lanthanoid-containing Lewis acids.

According to the invention, the element compounds of main group 13 and/or transition group 3 also include the form of halides, alkyl compounds, fluorinated, cycloaliphatic and/or heterocyclic compounds.

One embodiment of the invention envisages the use, as element compounds of main group 13, of boron-containing catalysts, which include but is not limited to boron halides, alkyl compounds, fluorinated, cycloaliphatic and/or heterocyclic compounds.

Another embodiment of the invention envisages the use of fluorinated and/or unfluorinated organoboron compounds, which includes but is not limited to:

$(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(Ph)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14}B)(C_6F_5)$; $(C_6F_5)_2B(OC_2H_5)$; $(C_6F_5)_2B$—$CH_2CH_2Si(CH_3)_3$;

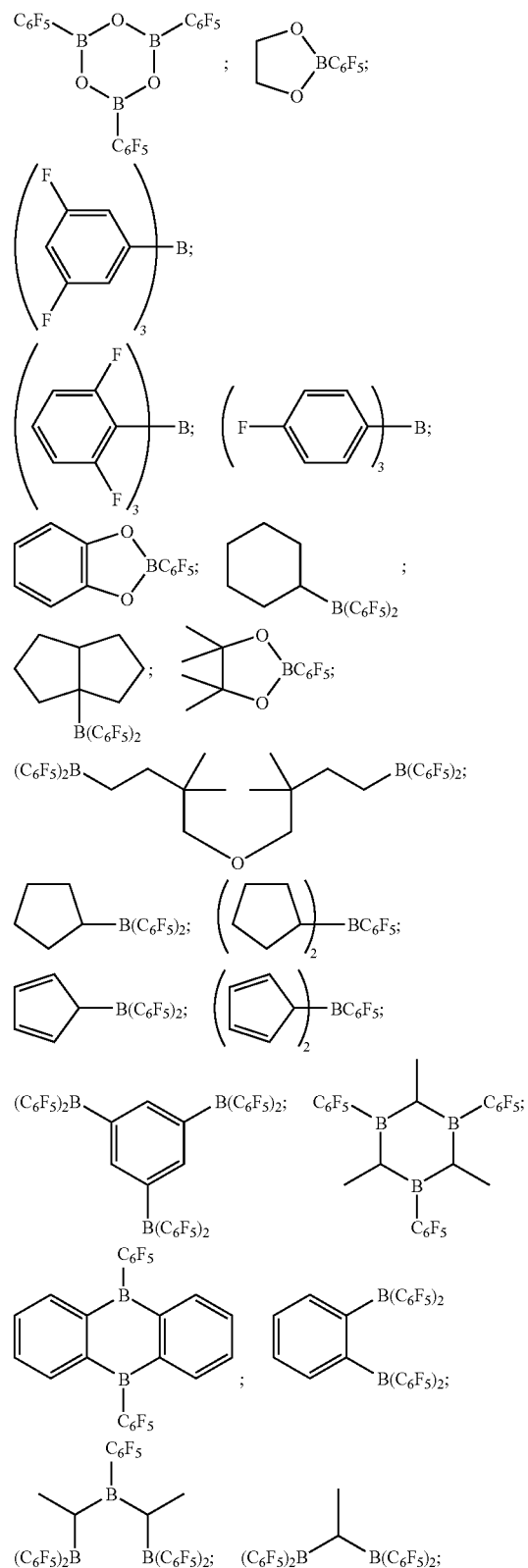

In yet another embodiment of the invention, the fluorinated and/or non-fluorinated organoboron compounds used are selected from the group consisting of tris(perfluorotriphenylborane) [1109-15-5], borane trifluoride etherate [109-63-7], borane-triphenylphosphine complex [2049-55-0], triphenylborane [960-71-4], triethylborane [97-94-9] and boron trichloride [10294-34-5], tris(pentafluorophenyl)boroxine (9Cl) [223440-98-0], 4,4,5,5-tetramethyl-2-(pentafluorophenyl)-1,3,2-dioxaborolane (9Cl) [325142-81-2], 2-(pentafluorophenyl)-1,3,2-dioxaborolane (9Cl) [336880-93-4], bis(pentafluorophenyl)cyclohexylborane [245043-30-5], di-2,4-cyclopentadien-1-yl(pentafluorophenyl)borane (9Cl) [336881-03-9], (hexahydro-3a(1H)-pentalenyl)bis(pentafluorophenyl)borane (9Cl) [336880-98-9], 1,3-[2-[bis(pentafluorophenyl)boryl]ethyl]tetramethyldisiloxane [336880-99-0], 2,4,6-tris(pentafluorophenyl)borazine (7Cl, 8Cl, 9Cl) [1110-39-0], 1,2-dihydro-2-(pentafluorophenyl)-1,2-azaborine (9Cl) [336880-94-5], 2-(pentafluorophenyl)-1,3,2-benzodioxaborol (9Cl) [336880-96-7], tris(4-trifluoromethoxyphenyl)borane [336880-95-6], tris(3-trifluoromethylphenyl)borane [24455-00-3], tris(4-fluorophenyl)borane [47196-74-7], tris(2,6-difluorophenyl)borane [146355-09-1], tris(3,5-difluoro-phenyl)borane [154735-09-8], methyliumtriphenyl tetrakis(pentafluorophenyl)borate [136040-19-2], N,N-dimethylanilinium tetrakis (pentafluorophenyl)borate and mixtures thereof.

In yet another embodiment of the invention envisages the use of fluorinated and/or unfluorinated organoaluminum compounds, especially those which are selected from:

AlCl$_3$ [7446-70-0], aluminum acetylacetonate [13963-57-0], AlF$_3$ [7784-18-1], aluminum trifluoromethanesulfonate [74974-61-1], di-i-butylaluminum chloride [1779-25-5], di-1-butylaluminum hydride [1191-15-7], triethylaluminum [97-93-8] and mixtures thereof.

Still another embodiment envisages the use of fluorinated and/or unfluorinated organoscandium compounds, which are selected from the group consisting of:

scandium(III) chloride [10361-84-9], scandium(III) fluoride [13709-47-2], scandium(III) hexafluoro-acetylacetonate [18990-42-6], scandium(III) trifluoro-methanesulfonate [144026-79-9], tris(cyclo-pentadienyl)scandium [1298-54-0] and mixtures thereof.

Still another embodiment of the invention envisages the use of fluorinated and/or unfluorinated organoyttrium compounds, which are selected from the group consisting of:

tris(cyclopentadienyl)yttrium [1294-07-1], yttrium(III) chloride [10361-92-9], yttrium(III) fluoride [13709-49-4], yttrium(III) hexafluoroacetylacetonate [18911-76-7], yttrium (III) naphthenate [61790-20-3] and mixtures thereof.

Still another embodiment of the invention envisages the use of fluorinated and/or unfluorinated organolanthanum compounds, especially those which are selected from the group consisting of:

lanthanum(III) chloride [10099-58-8], lanthanum(III) fluoride [13709-38-1], lanthanum(III) iodide [13813-22-4], lanthanum(III) trifluoromethanesulfonate [52093-26-2], tris(cyclopentadienyl)lanthanum [1272-23-7] and mixtures thereof.

Still another embodiment of the invention envisages the use of fluorinated and/or unfluorinated organolanthanoid compounds, which are selected from the group consisting of:

Cerium(III) bromide [14457-87-5], cerium(III) chloride [7790-86-5], cerium(III) fluoride [7758-88-5], cerium(IV) fluoride [60627-09-0], cerium(III) trifluoroacetylacetonate [18078-37-0], tris(cyclopentadienyl)cerium [1298-53-9], europium(III) fluoride [13765-25-8], europium(III) chloride [13769-20-5], praseodym(III) hexafluoroacetylacetonate [47814-20-0], praseodym(III) fluoride [13709-46-1], praseodym(III) trifluoroacetylacetonate [59991-56-9], samarium(III) chloride [10361-82-7], samarium(III) fluoride [13765-24-7], samarium(III) naphthenate [61790-20-3], samarium(III) trifluoroacetylacetonate [23301-82-8], ytterbium(III) fluoride [13760-80-8], ytterbium(III) trifluoromethanesulfonate [54761-04-5], tris(cyclopentadienyl)ytterbium [1295-20-1] and mixtures thereof.

The catalyst may be used in homogeneous form or as a heterogeneous catalyst. Equally possible is an embodiment as a homogenized heterogeneous or heterogenized homogeneous catalyst in the context of the invention.

In the process according to the invention, it is possible in principle to use any alcoholic organic compound having hydroxyl groups, including the monoalcohols, diols, triols, polyols, aminoalcohols, fluorinated alcohols and any other substituted alcohols and, for example, hydroxycarboxylic acids and their particular derivatives.

In one embodiment of the invention, the alcohol are selected from the group consisting of ethanol, propylene oxide- or ethylene oxide-functionalized polyether alcohols which have been started, for example, with butyl alcohol, allyl alcohol or nonylphenyl, and styrene oxide-containing and/or butylene oxide-containing polyether alcohols.

In another embodiment of the invention, the alcohol is an aminoalcohol. In still another embodiment of the invention, the alcohols are selected from the group consisting of hydroxyalkyl(meth)acrylates, polyether-alkyl (meth)acrylates, hydroxyalkyl acrylates, and polyether-alkyl acrylates. One advantage of these alcohols is that a particularly economically viable procedure is possible with them.

In another embodiment of the invention, the alcohol is used in a stoichiometric deficiency. In another embodiment of the invention, the alcohol is given in the process according to the invention to setting the quantitative ratio of SiH groups to alcohol groups within a range selected from the group consisting of from about 1:0.1 up to about 1:0.99, from about 1:0.5 to about 1:0.99, and from about 1:0.7 to about 1:0.95 molar equivalents.

Polyorganosiloxanes used in the process according to the invention may be purely terminal, i.e. ≡Si(H) groups are present only at the head groups of the polysiloxane chain, purely lateral, i.e. ≡Si(H) groups are present only in the interior but not at the head groups of the polysiloxane chain, or have mixed positions.

In still another embodiment of the invention, the process according to the invention, it is possible to use comb-like α,ω-disubstituted and mixed polydimethyl-hydrogensiloxanes of the general formula (I).

Still another embodiment of the invention is the use of polyorganosiloxanes of the following formula (II)

$$M\text{-}O\text{-}D_x\text{-}D'_y\text{-}M \qquad (II)$$

where
M is trialkylsilyl, especially trimethylsilyl,
$D_x$ is (dialkylsilyloxy)$_x$, especially (dimethyl-silyloxy)$_x$,
$D'_y$ is (—O(CH$_3$)Si(H)$_y$)—.

Still another embodiment of the invention is the use of polyorganosiloxanes of the following formula (III)

$$M'\text{-}O\text{-}D_x\text{-}M' \qquad (III)$$

where
M' is dialkyl(hydro)silyl, especially dimethyl-hydrosilyl, and
$D_x$ is (dialkylsilyloxy)$_x$, especially (dimethyl-silyloxy)$_x$.

Still another embodiment of the invention is the use of polyorganosiloxanes of the following formula (IV)

$$M'\text{-}O\text{-}D_x\text{-}D'_y\text{-}M' \qquad (IV)$$

where
M' is dialkyl(hydro)silyl, especially dimethyl-hydrosilyl,
$D_x$ is (dialkylsilyloxy)$_x$, especially (dimethyl-silyloxy)$_x$,
$D'_y$ is (—O(CH$_3$)Si(H)$_y$)—.

The process according to the invention can be performed without solvent, which, especially for industrial scale implementation from economic and ecological aspects, constitutes a considerable advantage over the prior art process.

A further embodiment of the present invention relates to polyorganosiloxanes obtainable by a process according to the invention.

Unlike previous processes for making polyorganosiloxanes, it is possible in accordance with the invention to prepare polyorganosiloxanes which have been substituted by organyloxy groups and/or aminoorganyloxy groups and are not contaminated with hydrochloric acid, hydrogen chloride or chlorides corresponding to their neutralization products which stem from the substitution reaction. This eases further processing and workup considerably.

For example, a laborious filtering-off of the chloride-containing neutralization product, for example in the form of ammonium chloride, is dispensed with. In addition to the avoidance of neutralization products in the above sense and the avoidance of filter aids, no product losses arise through products adhering on the salt or possibly also on the filtration aid.

With the process according to the invention, a way has therefore been found of preparing polyorganosiloxanes containing terminal and/or lateral Si—O—C-bonded homogeneous or mixed radicals selected from linear or branched, saturated, monounsaturated or polyunsaturated, aromatic, aliphatic-aromatic mono- or polyalcohols, hydroxyalkyl methacrylates, polyether-alkyl methacrylates, hydroxyalkyl acrylates, polyether-alkyl acrylates, polyethers, polyether alcohols or aminoalcohols, especially N-alkyl-, arylamino- EO- or PO-alcohols, N-alkyl- or arylaminoalcohols or mixtures thereof, which are free of the impurities mentioned, especially residual constituents of hydrochloric acid and neutralization products which contain chloride.

In one embodiment of the invention, the polyorganosiloxanes are those in which the radicals are selected from simple alcohols such as methanol, ethanol, 1H-pentadecafluoro-1-octanol etc., and butyl polyether, allyl polyether, nonylphenyl polyether, methyl polyether, hydroxyethyl acrylate, hydroxypropyl acrylate, hydroxybutyl acrylate, Bisomer PEA 6, monoacrylated dicaprolactone (Sartomer SR 495), pentaerithritol triacrylate and aminopolyether.

The inventive polyorganosiloxanes may, in a further embodiment of the invention, be used for the finishing of textiles, as additives for plastics or in the masonry paints sector, as additives in radiation-curing coatings, e.g. printing inks, and/or as polyurethane foam stabilizers.

The invention is further described by the following non-limiting examples which further illustrate the invention, and are not intended, nor should they be interpreted to, limit the scope of the invention.

EXAMPLES

Siloxanes

The siloxanes are generally purely terminal siloxanes (for example: M'-O-D$_{13}$-M') or purely lateral siloxanes (for example: M-O-D'$_5$-D$_{22}$-M).

Alcohols:

The polyether alcohols were freed of residual water traces before use by a distillation under reduced pressure.

Boron-Containing Catalyst:

The catalyst was used as commercially available, i.e. without further treatment and purification.

Reaction:

All reactions were performed under protective gas. The reaction formed hydrogen which was led out through a bubble counter. Three types of reaction were distinguished.

Reaction (A):

Initial charging of polyether/alcohol, heating to reaction temperature, addition of catalyst and subsequent dropwise addition of the siloxane under temperature control.

Reaction (B):

Initial charging of siloxane, heating to reaction temperature, addition of catalyst and subsequent dropwise addition of the polyether/alcohol under temperature control.

Reaction (C):

Initial charging of siloxane and polyether/alcohol, heating to reaction temperature, addition of the catalyst and performance of the reaction.

Analyses:

The conversion was determined by the determination of the residual SiH functions by means of a gas volumetric hydrogen determination [conversion stated in %; SiH value in val/kg of test substance]. The iodine number, consumption of iodine by the reaction with a double bond, was used to determine the double bond valences [iodine number reported in g of I$_2$/100 g of test substance]. The OH number was determined by the reaction of phthalic anhydride with free hydroxyl groups. The free acid was back-titrated with a base solution [OH number reported in mg KOH/g of test substance]. The viscosity was determined in a falling-ball viscometer (DIN method 53015).

First reactions of the terminal hydrogensiloxanes and then the reaction of a lateral siloxane are described hereinafter.

A) Reactions of α,ω-hydrogensiloxanes in a Dehydrogenative Hydrosilylation

Example 1

Reaction of M'-O-D13-M'-siloxane with a Deficiency of butyl polyether Using tris(perfluorotriphenylborane)

100 g of M'-O-D13-M'-siloxane (SiH value 1.77 val/kg) were reacted with 269.3 g of a butyl alcohol-started, purely (propylene oxide) PO-containing polyether (mean molar mass of 1900 g/mol) with an OH number of 29.5. The polyether was used at 20 mol % deficiency based on the SiH value. After reaction (A), 0.17 g of tris(perfluorotriphenylborane), corresponding to 0.19 mol %, based on the SiH value, was added at 95° C. Approx. 180 min after the metered addition of siloxane had ended, the conversion, according to the SiH value method, was 99.8%. The product had a viscosity of 446 mPas.

Example 2

Reaction of M'-O-D13-M'-siloxane with a Deficiency of butyl polyether Using tris(perfluorotriphenylborane)

100 g of M'-O-D13-M'-siloxane (SiH value 1.77 val/kg) were reacted with 269.3 g of a butyl alcohol-started, purely PO-containing polyether (mean molar mass of 1900 g/mol) with an OH number of 29.5. The polyether was used at 20 mol % deficiency based on the SiH value. After reaction (C), 0.11 g of tris(perfluorotriphenylborane), corresponding to 0.12 mol %, based on the SiH value, was added at 95° C. Approx. 60 min after the catalyst addition, the conversion, according to the SiH value method, was 100%. The product had a viscosity of 443 mPas.

Comparative Example 1

Reaction of M'-O-D13-M'-siloxane with a Deficiency of butyl polyether Using tris(perfluorotriphenylborane)

80 g of M'-O-D13-M'-siloxane (SiH value 1.77 val/kg) were reacted with 296.2 g of a butyl alcohol-started, purely PO-containing polyether (mean molar mass of 1900 g/mol) with an OH number of 29.5. The polyether was used at 10 mol % excess based on the SiH value.

After reaction (A), 0.11 g of tris(perfluorotriphenylborane), corresponding to 0.15 mol %, based on the SiH value, was added at 95° C. Approx. 30 min after the metered addition of siloxane had ended, the conversion, according to the SiH value method, was 100%. The product had a viscosity of 389 mPas.

B) Reactions of a Lateral Hydrogensiloxanes in a Dehydrogenative Hydrosilylation Example 3

Reaction of M-O-D'5-D22-M-siloxane with a Deficiency of allyl polyether Using tris(perfluorotriphenylborane)

50 g of M-O-D'5-D22-M-siloxane (SiH value 2.46 val/kg of SiH) were reacted with 82.7 g of an allyl alcohol-started mixed EO-/PO-containing polyether (mean molar mass of 840 g/mol; PO content is 26 mol %) with an iodine number of 30.2 g of $I_2$/100 g and with an OH number of 69.3 mg KOH/g. The polyether was used at 20 mol % deficiency based on the SiH value. After reaction (C), 0.31 g of tris(perfluorotriphenylborane), corresponding to 0.5 mol %, based on the SiH value, was added at 90° C. Approx. 120 min after the catalyst addition, the conversion by the SiH value method was approx. 100%. The product had a viscosity of 7245 mPas and an iodine number of 18.7 g of $I_2$/100 g (theoretical iodine number 18.8 g of $I_2$/100 g corresponding to virtually complete presence of double bonds).

Comparative Example 2

Reaction of M-O-D'5-D22-M-siloxane with Equimolar Amounts of allyl polyether Using tris(perfluorotriphenylborane)

50 g of M-O-D'5-D22-M-siloxane (SiH value 2.46 val/kg of SiH) were reacted with 103.4 g of an allyl alcohol-started mixed EO-/PO-containing polyether (mean molar mass of 840 g/mol; PO content is 26 mol %) with an iodine number of 30.2 g of $I_2$/100 g and with an OH number of 69.3 mg KOH/g. The polyether was used at 0 mol % deficiency based on the SiH value. After reaction (C), 0.31 g of tris(perfluorotriphenylborane), corresponding to 0.5 mol %, based on the SiH value, was added at 90° C. Approx. 180 min after the catalyst addition, the conversion by the SiH value method was approx. 100%. The product had a viscosity of 371 mPas and an iodine number of 20.4 g of $I_2$/100 g (theoretical iodine number 20.4 g of $I_2$/100 g corresponding to virtually complete presence of double bonds).

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for reacting polyorganosiloxanes which contain ≡Si(H) units and are of the general formula (I)

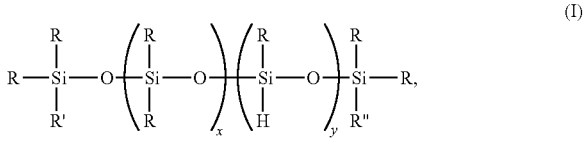

in which
at least one hydrogen atom is bonded to a silicon atom,
R represents one or more identical or different radicals selected from linear or branched, saturated, monounsaturated or polyunsaturated alkyl, aryl, alkaryl or aralkyl radicals having from 1 to 20, haloalkyl groups having from 1 to 20 carbon atoms, siloxy groups and triorganosiloxy groups,
R' and R" are each independently H or R,
x is an integer from 0 to 300,
y is an integer from 0 to 100,
with at least one alcohol which is selected from the group of the linear or branched, saturated, monounsaturated or polyunsaturated, aromatic, aliphatic-aromatic mono- or polyalcohols, polyether monoalcohols or polyether polyalcohols, aminoalcohols, mono- or poly(meth)acrylated monoalkoxylates or polyalkoxylates, hydroxyalkyl methacrylates, hydroxyalkyl acrylates, halogenated mono- or polyalcohols, polyester monoalcohols, polyester polyalcohols, fluorinated or perfluorinated monoalkoxylates or polyalkoxylates and mixtures thereof, with a stoichiometric excess of polyorganosiloxanes which contain ≡Si(H) units and are of the general formula (I) in the presence of one or more element compounds of main group III and/or transition group 3 as a catalyst, wherein the reaction, on completion of conversion of the alcohol component, is continued in the presence of one or more element compounds of main group III and/or transition group 3 as a catalyst until no further ≡Si—H groups can be detected by gas volumetric means.

2. The process as claimed in claim 1, wherein the element compounds of main group III are one or more boron-containing catalysts.

3. The process as claimed in claim 1, wherein the element compounds of main group III used are halides, alkyl compounds, fluorinated, cycloaliphatic and/or heterocyclic compounds.

4. The process as claimed in claim 2, wherein a catalyst is used which is selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(Ph)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14}B)(C_6F_5)$; $(C_6F_5)_2B(OC_2H_5)$; $(C_6F_5)_2B$—$CH_2CH_2Si(CH_3)_3$;

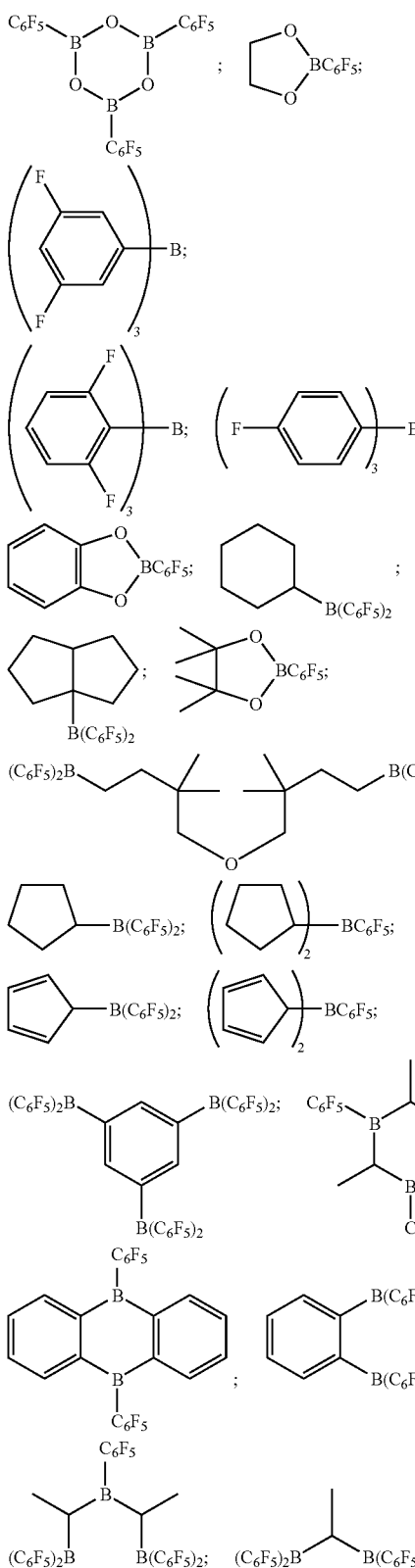

tris(perfluorotriphenylborane), borane trifluoride etherate, borane-triphenylphosphine complex, triphenylborane, triethylborane and boron trichloride, tris(pentafluorophenyl) boroxine (9Cl), 4,4,5,5-tetramethyl-2-(pentafluorophenyl)-1,3,2-dioxaborolane (9Cl), 2-(pentafluorophenyl)-1,3,2-dioxaborolane (9Cl), bis(pentafluorophenyl)cyclohexylborane, di-2,4-cyclopentadien-1-yl (pentafluorophenyl)borane (9Cl), (hexahydro-3a(1H)-pentalenyl)bis(pentafluorophenyl)borane (9Cl), 1,3-[2-[bis(pentafluorophenyl)boryl]ethyl]tetramethyldisiloxane, 2,4,6-tris(pentafluorophenyl)borazine (7Cl, 8Cl, 9Cl), 1,2-dihydro-2-(pentafluorophenyl)-1,2-azaborine (9Cl), 2-(pentafluorophenyl)-1,3,2-benzodioxaborol (9Cl), tris(4-trifluoromethoxyphenyl)borane, tris(3-trifluoromethylphenyl)borane, tris(4-fluorophenyl)borane, tris(2,6-difluorophenyl)borane, tris(3,5-difluorophenyl)borane, methyliumtriphenyl tetrakis (pentafluorophenyl)borate, N,N-dimethylanilinium tetrakis(pentafluorophenyl)borate and mixtures thereof.

5. The process as claimed in claim 1, wherein an alcohol is used which is selected from the group of methanol, ethanol, fluorinated alcohols, butyl polyether alcohols, allyl polyether alcohols or nonylphenyl polyether alcohols, ethylene oxide-containing and/or propylene oxide-containing and/or styrene oxide-containing and/or butylene oxide-containing polyether alcohols, amino alcohols, mono- or poly(meth)acrylated monoalkoxylates or polyalkoxylates, hydroxyalkyl(meth)acrylates, hydroxyalkyl acrylates, halogenated mono- or polyalcohols, polyester monoalcohols, polyester polyalcohols, fluorinated or perfluorinated monoalkoxylates or polyalkoxylates and mixtures thereof.

6. The process as claimed in claim 1, wherein a quantitative ratio of =SiH groups to alcohol groups in the range from about 1:0.1 to about 1:0.99 molar equivalents is established.

7. The process as claimed in claim 1, wherein polyorganosiloxanes are used which are selected from the group of the comb-like and/or α,ω-disubstituted polydimethyl hydrogensiloxanes of the general formula (I).

8. The process as claimed in claim 7, wherein polyorganosiloxanes are used which are selected from compounds of the general formula (II)

$$M\text{-}O\text{-}D_x\text{-}D'_y\text{-}M \qquad (II)$$

where

M is trialkylsilyl, $D_x$ is (dialkylsilyloxy)$_x$, $D'_y$ is $(-\!\!-\!\!O(CH_3)Si(H)_y)-\!\!-$.

9. The process as claimed in claim 7, wherein polyorganosiloxanes are used which are selected from compounds of the general formula (III)

$$M'\text{-}O\text{-}D_x\text{-}M' \qquad (III)$$

where

M' is dialkyl(hydro)silyl, and $D_x$ is (dialkylsilyloxy)$_x$.

10. The process as claimed in claim 7, wherein polyorganosiloxanes are used which are selected from the group of the general formula (IV)

$$M'\text{-}O\text{-}D_x\text{-}D'_y\text{-}M' \qquad (IV)$$

where

M' is dialkyl(hydro)silyl, $D_x$ is (dialkylsilyloxy)$_x$, $D'_y$ is $(-\!\!-\!\!O(CH_3)Si(H)_y)-\!\!-$.

11. The process as claimed in claim 1, wherein the reaction is performed without solvent.

12. The process of claim 1, wherein the aminoalcohols are N-alkyl-, arylamino-EO- and -PO-alcohols, N-alkyl- or arylaminoalcohols.

13. A method of stabilizing and/or defoaming masonry paints, radiation-curing coatings or printing inks comprising adding to any of these a polyorganosiloxane produced by a process comprising reacting polyorganosiloxanes which contain —Si(H) units and are of the general formula (I)

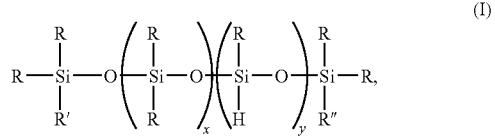

in which
at least one hydrogen atom is bonded to a silicon atom,
R represents one or more identical or different radicals selected from linear or branched, saturated, monounsaturated or polyunsaturated alkyl, aryl, alkaryl or aralkyl radicals having from 1 to 20, haloalkyl groups having from 1 to 20 carbon atoms, siloxy groups and triorganosiloxy groups,
R' and R" are each independently H or R,
x is an integer from 0 to 300,
y is an integer from 0 to 100,
with at least one alcohol which is selected from the group of the linear or branched, saturated, monounsaturated or polyunsaturated, aromatic, aliphatic-aromatic mono- or polyalcohols, polyether monoalcohols or polyether polyalcohols, aminoalcohols, mono- or poly(meth)acrylated monoalkoxylates or polyalkoxylates, hydroxyalkyl methacrylates, hydroxyalkyl acrylates, halogenated mono- or polyalcohols, polyester monoalcohols, polyester polyalcohols, fluorinated or perfluorinated monoalkoxylates or polyalkoxylates and mixtures thereof, with a stoichiometric excess of polyorganosiloxanes which contain —Si(H) units and are of the general formula (I) in the presence of one or more element compounds of main group III and/or transition group 3 as a catalyst, wherein the reaction on completion of conversion of the alcohol component, is continued in the presence of one or more element compounds of main group III and/or transition group 3 as a catalyst until no further —Si—H groups can be detected by gas volumetric means.

* * * * *